United States Patent
Oba

(10) Patent No.: US 10,994,712 B2
(45) Date of Patent: May 4, 2021

(54) VEHICLE CONTROL DEVICE AND VEHICLE CONTROL METHOD

(71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 364 days.

(21) Appl. No.: 15/738,797

(22) PCT Filed: May 17, 2016

(86) PCT No.: PCT/JP2016/064602
§ 371 (c)(1),
(2) Date: Dec. 21, 2017

(87) PCT Pub. No.: WO2017/002471
PCT Pub. Date: Jan. 5, 2017

(65) Prior Publication Data
US 2018/0178766 A1   Jun. 28, 2018

(30) Foreign Application Priority Data
Jul. 2, 2015   (JP) .............................. JP2015-133496

(51) Int. Cl.
*B60T 7/22* (2006.01)
*B60W 50/10* (2012.01)
(Continued)

(52) U.S. Cl.
CPC .................. *B60T 7/22* (2013.01); *B60T 7/14* (2013.01); *B60W 50/10* (2013.01); *B60W 50/14* (2013.01);
(Continued)

(58) Field of Classification Search
CPC .......... B60T 7/22; B60T 7/14; B60T 2210/30; B60W 50/10; B60W 50/14; G05D 1/0061;
(Continued)

(56) References Cited

U.S. PATENT DOCUMENTS 5,286,099 A * 2/1994 Fujita ....................... B60T 7/22
180/271
6,590,236 B1 * 7/2003 El-Zein ................... C30B 25/18
257/201

(Continued)

FOREIGN PATENT DOCUMENTS

JP   04-082432 A   3/1992
JP   06-47643 A    6/1994
(Continued)

OTHER PUBLICATIONS

International Search Report and Written Opinion in PCT/JP2016/064602 dated Jun. 28, 2016 (10 pages).

*Primary Examiner* — Paula L Schneider
(74) *Attorney, Agent, or Firm* — Chip Law Group

(57) ABSTRACT

An environment information acquisition unit acquires an image in which environment around a vehicle has been imaged, information indicating a contact with the vehicle or an impact on the vehicle, surround sounds, approach identification information for enabling an approach of an emergency vehicle to be identified, and the like as surrounding environment information of the vehicle. A vehicle control processing unit recognizes predetermined external stimulation information included in the surrounding environment information, for example, a specific signal or a movement with a specific pattern, a contact to a specific part, and a specific sound. The vehicle control processing unit uses the recognized predetermined external stimulation information as a vehicle brake instruction from outside and starts a vehicle braking sequence to stop the vehicle. Even if an abnormality occurs in an automatically driven vehicle and the like, vehicle brake control is easily applied to a traveling vehicle from outside.

27 Claims, 6 Drawing Sheets

(51) Int. Cl.
  *B60T 7/14* (2006.01)
  *B60W 50/14* (2020.01)
  *G08G 1/0965* (2006.01)
  *G08G 1/16* (2006.01)
  *G05D 1/00* (2006.01)
  *G05D 1/02* (2020.01)

(52) U.S. Cl.
  CPC ......... *G05D 1/0061* (2013.01); *G05D 1/0231* (2013.01); *G05D 1/0276* (2013.01); *G08G 1/0965* (2013.01); *G08G 1/16* (2013.01); *B60T 2210/30* (2013.01); *G05D 2201/0213* (2013.01)

(58) Field of Classification Search
  CPC ............... G05D 1/0231; G05D 1/0276; G05D 2201/0213; G08G 1/0965; G08G 1/16
  USPC .......................................................... 701/70
  See application file for complete search history.

(56) References Cited

U.S. PATENT DOCUMENTS

| | | | | |
|---|---|---|---|---|
| 8,676,427 | B1* | 3/2014 | Ferguson | G05D 1/0255 701/23 |
| 2008/0080741 | A1* | 4/2008 | Yokoo | B60R 21/01538 382/104 |
| 2010/0045101 | A1* | 2/2010 | Stabrey | B60T 7/22 303/191 |
| 2013/0018549 | A1* | 1/2013 | Kobana | B60K 28/06 701/41 |
| 2014/0223384 | A1* | 8/2014 | Graumann | G06F 3/023 715/863 |
| 2014/0294241 | A1* | 10/2014 | Kim | G06F 3/0346 382/104 |
| 2015/0251693 | A1* | 9/2015 | Lavoie | B60W 10/18 701/41 |
| 2015/0251697 | A1* | 9/2015 | Lavoie | B62D 13/06 701/523 |
| 2016/0090104 | A1* | 3/2016 | Diaz-Jimenez | B60W 50/10 701/70 |
| 2016/0139594 | A1* | 5/2016 | Okumura | B60W 30/00 701/2 |
| 2018/0012492 | A1* | 1/2018 | Baldwin | G05D 1/0261 |
| 2018/0074497 | A1* | 3/2018 | Tsuji | B60R 16/02 |

FOREIGN PATENT DOCUMENTS

| | | |
|---|---|---|
| JP | 06-047643 U | 6/1994 |
| JP | 2003-118550 A | 4/2003 |
| JP | 2006-275690 A | 10/2006 |
| JP | 2007-323598 A | 12/2007 |
| JP | 2013-154760 A | 8/2013 |
| JP | 2014-058229 A | 4/2014 |
| JP | 2014-164706 A | 9/2014 |
| WO | 2013/115246 A1 | 8/2013 |
| WO | 2015/056530 A1 | 4/2015 |

* cited by examiner

*FIG. 4*

| REGARDING DRIVER | BEHAVIOR IS WRONG |
| --- | --- |
| | DRIVER CANNOT BE SEEN |
| | BEHAVIOR OF DRIVER IS LIKELY TO BE RUNAWAY AS VIEWED FROM OTHER PERSON |
| | ... |
| REGARDING VEHICLE | VEHICLE IS TRAVELING AFTER COMMITTING VIOLATION |
| | VEHICLE ENTERS ENTRY PROHIBITED AREA |
| | VEHICLE IS TRAVELING IN TRAVELING PROHIBITED AREA |
| | VEHICLE IS TRAVELING WRONG WAY ON ONE-WAY ROAD |
| | VEHICLE HITS-AND-RUNS |
| | ... |
| REGARDING ENVIRONMENT | REMOTE TRANSMISSION INDICATING THAT ABNORMALITY OCCURS IS NOTIFIED TO PASSENGER |
| | CENTRAL MONITORING SERVICE ISSUES REMOTE COMMAND |
| | UNEXPECTED EVENT SUCH AS ACCIDENT HAS OCCURRED IN DEDICATED LANE |
| | STOP INSTRUCTION TO FOLLOWING VEHICLE IS REQUIRED DUE TO EMERGENCY SITUATION |
| | EMERGENCY VEHICLE IS APPROACHING |
| | NOTIFICATION PROCESSING TO FOLLOWING VEHICLE OF LANE INTERRUPTION DUE TO ACCIDENT OR FAILURE DURING TRAVELING IN DEDICATED LANE |
| | IT IS NECESSARY TO NOTIFY FOLLOWING VEHICLE OF DETECTION OF OBSTACLE DURING TRAVELING IN DEDICATED LANE |
| | CLOSURE OF LANE DUE TO EMERGENCY EVENT IS NOTIFIED (ACCIDENT, FLOODING OF RIVER, AND THE LIKE) |
| | ... |

FIG. 5

| BRAKE INSTRUCTING SIDE | ACTION OR INFORMATION OF BRAKE INSTRUCTION |
|---|---|
| PEDESTRIAN AND PERSON, INVOLVED IN ACCIDENT, IN FRONT OF VEHICLE | INSTRUCTION TO STOP VEHICLE BY SIGNAL AND GESTURE |
| PEDESTRIAN STANDING ON FRONT AND SIDE OF VEHICLE (WHEN VEHICLE IS TRAVELING AT LOW SPEED) | TOUCH WITH SPECIFIC PATTERN, TOUCH ON SPECIFIC PART, AND THE LIKE |
| VEHICLE IN FRONT OF THE VEHICLE | BLINKING AND LIGHTING DIRECTION INDICATOR ON PASSING LANE SIDE IN SPECIFIC PATTERN<br>SPECIFIC SOUND AND THE LIKE |
| VEHICLE ON SIDE | SPECIFIC SOUND AND THE LIKE |
| VEHICLE BEHIND THE VEHICLE | SPECIFIC SOUND AND THE LIKE |
| MOTORCYCLE TRAVELING ON SIDE | SPECIFIC SOUND<br>TOUCH WITH SPECIFIC PATTERN, TOUCH ON SPECIFIC PART, AND THE LIKE |
| POLICE OFFICER AND THE LIKE | EMERGENCY STOP WIRELESS INFORMATION VIA WIRELESS COMMUNICATION NETWORK (FOR EXAMPLE, DSRC) AND THE LIKE |
| ROAD MANAGER AND THE LIKE | WIRELESS INFORMATION FOR NOTIFYING OCCURRENCE OF EVENT SUFFICIENTLY BEFORE PLACE WHERE TRAVELING TROUBLE EVENT OCCURS IF TRAVELING TROUBLE EVENT OCCURS IN AUTOMATIC TRAVELING LANE<br>WIRELESS INFORMATION FOR NOTIFYING THAT AUTOMATIC DRIVE IS TEMPORARILY STOPPED IN CERTAIN SECTION<br>REMOTE CONTROL INFORMATION AND THE LIKE |

FIG. 6

| | ACTION | PROCESSING |
|---|---|---|
| IN A CASE WHERE DRIVER DOES NOT INTERVENE | AUTOMATIC DRIVE IS CONTINUED, AND VEHICLE IS MOVED TO EVACUATION LANE ON THE BASIS OF VEHICLE BRAKING SEQUENCE AND IS STOPPED.<br><br>IN A CASE WHERE SEQUENCE FOR MOVING VEHICLE TO EVACUATION LANE IS STARTED, OPERATION BY DRIVER IS LIMITED SO THAT DRIVER DOES NOT RETURN TO MANUAL DRIVE IN HASTE. | |
| IN A CASE WHERE DRIVER INTERVENES | SWITCH TO MANUAL DRIVE, AND CONTINUE TRAVELING (MOVE TO NORMAL LANE) | AWAKE STATE CONFIRMATION PROCESSING (CONFIRM OPERATION WITH PREVIOUSLY DESIGNATED PATTERN)<br>SHIFT TRAVELING MODE STEP BY STEP<br>RECORD THAT TRAVELING MODE HAS BEEN SWITCHED TO MANUAL DRIVE |
| | CONTINUE AUTOMATIC DRIVE, AND RETURN TO AUTOMATIC DRIVE | LIMIT AUTOMATIC DRIVE ACCORDING TO TRAVELING CONDITION AT THE TIME OF CONTINUATION<br>RECORD HISTORY<br>NOTIFY HISTORY |

VEHICLE CONTROL DEVICE AND VEHICLE CONTROL METHOD

CROSS REFERENCE TO RELATED APPLICATIONS

This application is a U.S. National Phase of International Patent Application No. PCT/JP2016/064602 filed on May 17, 2016, which claims priority benefit of Japanese Patent Application No. JP 2015-133496 filed in the Japan Patent Office on Jul. 2, 2015. Each of the above-referenced applications is hereby incorporated herein by reference in its entirety.

TECHNICAL FIELD

The present technology relates to a vehicle control device, a vehicle control method, and a program, and can easily apply vehicle brake control to a traveling vehicle, for example, a vehicle which is automatically driven, from outside.

BACKGROUND ART

In recent years, various technologies for assisting a drive of a vehicle have been developed. For example, a technology is disclosed in Patent Document 1, such that, in a case where it has been determined that a driver has an abnormality, control to follow a preceding vehicle is automatically started, and secondary damage is avoided by stopping the vehicle when stop information of the preceding vehicle is acquired during the follow-up control.

CITATION LIST

Patent Document
Patent Document 1: JP 2014-058229 A

SUMMARY OF THE INVENTION

Problems to be Solved by the Invention

Meanwhile, regarding drive control of the vehicle, development in automatic driving operation has been advanced throughout the industry. When such an automatic driving operation is performed, in a case where the driver does not notice an abnormality in the automatic driving operation, and in a case where the driver lost a normal judgment ability and physical movement ability so that the driver cannot return to a manual drive, securement of safety may be difficult.

Accordingly, an object of the present technology is to provide a vehicle control device, a vehicle control method, and a program which can easily apply vehicle brake control from outside to a traveling vehicle.

Solutions to Problems

A first aspect of the present technology is a vehicle control device including an environment information acquisition unit that acquires surrounding environment information of a vehicle and a vehicle braking control unit that recognizes a vehicle brake instruction from outside on the basis of the surrounding environment information acquired by the environment information acquisition unit and starts a vehicle braking sequence on the basis of the recognition result.

According to the present technology, the environment information acquisition unit acquires an image in which environment around a vehicle has been imaged, information indicating a contact with the vehicle or an impact on the vehicle, surround sounds, approach identification information for enabling an approach of an emergency vehicle to be identified, and the like as the surrounding environment information of the vehicle. The vehicle braking control unit recognizes predetermined external stimulation information included in the surrounding environment information acquired by the environment information acquisition unit, for example, a specific signal or a movement with a specific pattern of a subject included in the imaged image around the vehicle, a contact to a specific part of the vehicle or an impact with a specific pattern on the vehicle, a specific sound included in the surround sounds, predetermined information included in the approach identification information as the vehicle brake instruction from outside and starts the vehicle braking sequence to stop the vehicle so as to secure safety. In the vehicle braking sequence, control for evacuating the vehicle in order to prioritize the traveling of the emergency vehicle, or control for shifting a traveling mode to a manual drive is performed as a part of the vehicle braking sequence. Furthermore, the vehicle braking sequence includes processing for invalidating the vehicle braking sequence by an instruction from the driver after the vehicle braking sequence has been started. In a case where an operation to invalidate the vehicle braking sequence is performed to invalidate the vehicle braking sequence, a recording and reproduction processing unit encrypts an invalidation history of the vehicle braking sequence performed by the instruction from the driver and records the invalidation history so as not to be rewritten and deleted. In addition, in a case where the vehicle braking sequence is invalidated and the automatic drive is continued, the vehicle braking control unit adds limitation to the automatic drive according to a surrounding environment at the time when the automatic drive is continued. A driver warning unit notifies the driver of the start of the vehicle braking sequence. Furthermore, here, the vehicle braking sequence indicates a series of controls to be performed according to conditions such as brake control, driver's condition grasping, traveling environment grasping, external environment grasping, steering control, display lamp control, and driver's state transition reflection control.

A second aspect of the present technology is a vehicle control method including acquiring surrounding environment information of a vehicle by an environment information acquisition unit and recognizing a vehicle brake instruction from outside on the basis of the surrounding environment information acquired by the environment information acquisition unit and starting a vehicle braking sequence on the basis of the recognition result by a vehicle braking control unit.

A third aspect of the present technology is a program for causing a computer to perform vehicle control, the program causing the computer to execute a step of acquiring surrounding environment information of a vehicle, and a step of recognizing a vehicle brake instruction from outside on the basis of the acquired surrounding environment information and starting a vehicle braking sequence on the basis of the recognition result.

Effects of the Invention

According to the present technology, a vehicle braking control unit recognizes a vehicle brake instruction from outside on the basis of surrounding environment information of a vehicle acquired by an environment information acquisition unit and starts a vehicle braking sequence on the basis of the recognition result. Therefore, vehicle brake control can be easily applied to a traveling vehicle from outside. Note that the effects described herein are only exemplary and not limited to these. Furthermore, there may be an additional effect.

BRIEF DESCRIPTION OF DRAWINGS

FIG. 4 is a diagram of situations as an example in which a third party desires to stop a vehicle from outside.

FIG. 5 is a diagram in which brake instructing sides and actions or information of brake instructions in a case where the vehicle is stopped from outside are exemplified.

FIG. 6 is a diagram of an exemplary operation in a case where the brake instruction has been received.

MODE FOR CARRYING OUT THE INVENTION

Embodiments for carrying out the present technology will be described below. Note that, the description will be in the following order.

1. Configuration of vehicle control device
2. Operation of vehicle control device
<1. Configuration of Vehicle Control Device>

Figure 1:
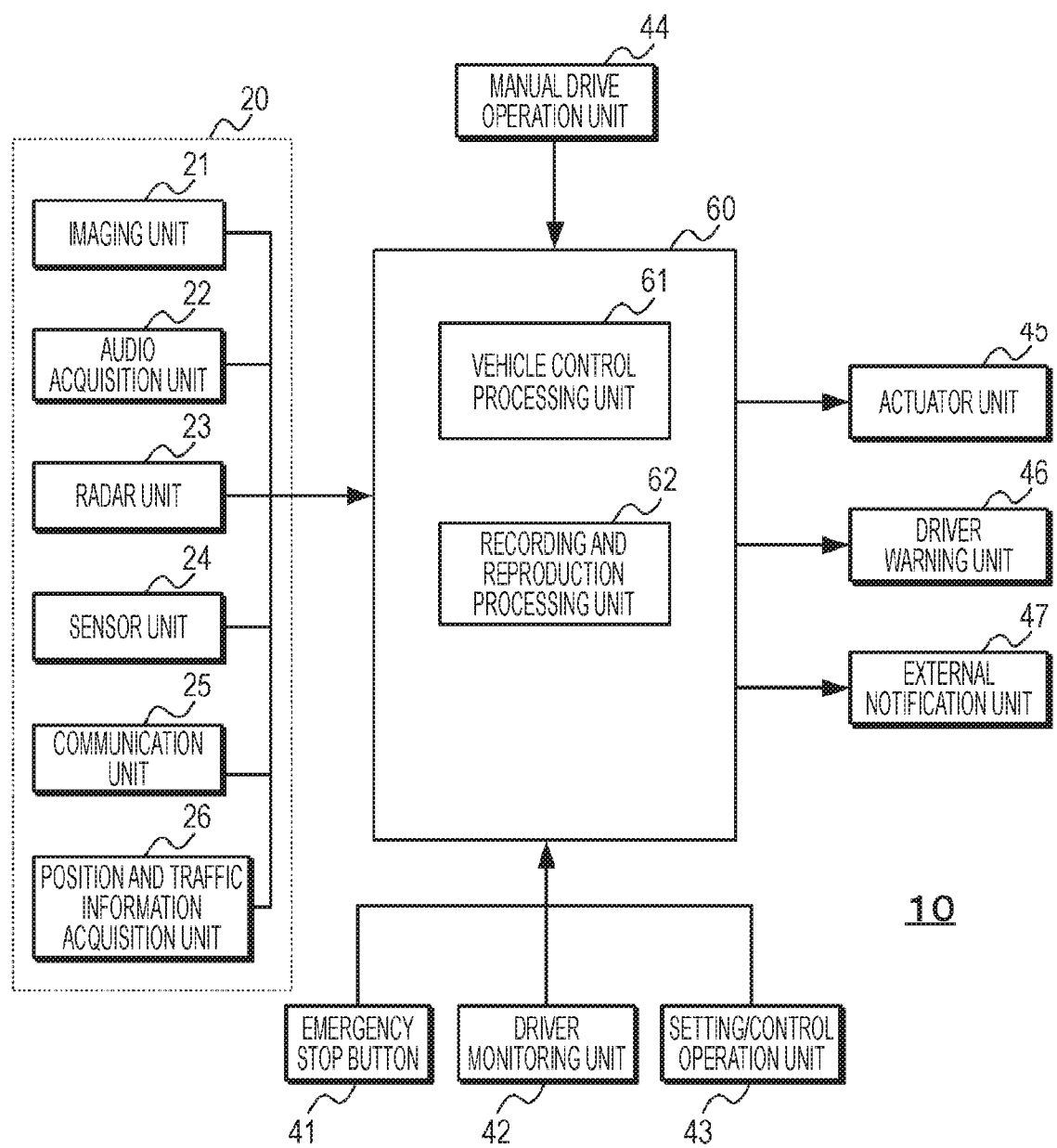
FIG. 1 is a diagram of a configuration of a vehicle control device.

FIG. 1 is a diagram of a configuration of a vehicle control device. A vehicle control device 10 includes an environment information acquisition unit 20 and an electronic control unit 60. Furthermore, the vehicle control device 10 includes an emergency stop button 41, a driver monitoring unit 42, a setting/control operation unit 43, a manual drive operation unit 44, an actuator unit 45, a driver warning unit 46, and an external notification unit 47.

The environment information acquisition unit 20 acquires surrounding environment information of the vehicle in which the vehicle control device 10 is provided. The environment information acquisition unit 20 includes, for example, an imaging unit 21, an audio acquisition unit 22, a radar unit 23, a sensor unit 24, a communication unit 25, and a position and traffic information acquisition unit 26.

The imaging unit 21 includes a camera (single camera) which images an image from a single viewpoint, and, for example, a stereo camera which images an image from a plurality of viewpoints and can calculate a distance from the imaged images from the plurality of viewpoints to a subject, and, for example, a time of flight (TOF) camera which can measure a distance on the basis of reflected light delay of pulse light or variable light. The imaging unit 21 outputs the imaged image generated by the camera to the electronic control unit 60 as the surrounding environment information.

Furthermore, the imaging unit 21 may be formed of three cameras having different focal lengths. For example, the imaging unit 21 includes a first camera which has a long focal length and an angle of view of 25 degrees, a second camera which has a focal length shorter than that of the first camera and an angle of view of 50 degrees, and a third camera which has a focal length shorter than that of the second camera and an angle of view of 150 degrees. In a case where a high resolution to detect a remote object is required, an image imaged by the first camera having the long focal length is used. In a case where an object positioned at a medium distance is detected, an image imaged by the second camera is used. In a case where a detection of an object positioned at a position as wide as possible is required, such as a case where an object positioned at a short distance is detected, an image imaged by the third camera having the short focal length and the wide angle of view is used. The first to third cameras are arranged near a room mirror in a windshield. Furthermore, the first to third cameras may be housed in a common housing, or may be respectively housed in separate housings. In addition, in a case where the first to third cameras are housed in the common housing, the first to third cameras are arranged side by side in the lateral direction. Although the order of the arranged cameras is arbitrary, it is preferable that the third camera having the largest angle of view be arranged at the center. With this arrangement, a possibility can be reduced that a part of the housing is reflected into the image imaged by the third camera having the large angle of view.

The housing includes a housing main body and a windshield attachment member, and the windshield attachment member is fixed to the inner side of the windshield with an adhesive member. Then, in a state where the windshield attachment member is fixed to the windshield, the housing main body is configured to be detachable from the windshield attachment member. The detachable housing main body can be easily repaired or replaced in a case where a failure is caused in the camera.

Furthermore, the housing may be integrally formed with the room mirror. Alternatively, the housing main body and the room mirror may be detachably arranged with respect to a single windshield attachment member. With this configuration, the number of parts can be reduced than a case where the windshield attachment members are separately provided.

The audio acquisition unit 22 is formed of a microphone. The audio acquisition unit 22 outputs surround sounds the vehicle to the electronic control unit 60 as the surrounding environment information.

The radar unit 23 is formed of a RADAR or a light detection and ranging (LIDAR). The radar unit 23 emits radio waves and light to measure reflected waves and reflected light from an object positioned, for example, in front of or behind the vehicle and outputs the analysis result to electronic control unit 60 as the surrounding environment information.

The sensor unit 24 is formed of a contact detection sensor, an impact detection sensor, and the like. The sensor unit 24 detects a contact or an impact when a third party outside the vehicle knocks on a vehicle body and a side mirror of the vehicle. Furthermore, the sensor unit 24 detects an impact such as a collision with an object or a collision with a following vehicle. The sensor unit 24 outputs the detection result to the electronic control unit 60 as the surrounding environment information. Furthermore, the sensor unit 24 includes a sensor or the like to acquire, for example, an inter-vehicle distance required for automatic drive.

The communication unit 25 communicates with the outside via any one or more wireless communication networks from among a wireless communication network for mobile phones such as 3G, LTE, and 4G, a wireless communication network of wireless LAN, and a wireless communication network of dedicated short range communication (DSRC) (registered trademark). The communication unit 25 communicates with the outside and outputs the received information to the electronic control unit 60 as the surrounding environment information.

The position and traffic information acquisition unit 26 receives a signal of a satellite positioning system such as a global positioning system (GPS) and performs positioning. Furthermore, the position and traffic information acquisition unit 26 receives a beacon signal indicating road traffic information and the like. The position and traffic information acquisition unit 26 outputs the positioning result, the received road traffic information, and the like to the electronic control unit 60 as the surrounding environment information.

The emergency stop button 41 is operated in a case where an abnormality is detected at the time of driving the vehicle and the vehicle is promptly stopped. The emergency stop button 41 outputs that the button has been operated to the electronic control unit 60.

The driver monitoring unit 42 monitors a driver to determine whether the driver loses a normal judgment ability or physical movement ability. For example, the driver monitoring unit 42 detects a direction of a face and opening degrees of eyelids from the imaged image of the driver. In a case where a period in which the driver does not face forward or a period in which the eyelids are closed than a predetermined opening degree has exceeded a threshold, the driver monitoring unit 42 determines whether the normal judgment ability or physical movement ability has been lost. Furthermore, the driver monitoring unit 42 judges ingestion of drugs or alcohol on the basis of expressions and behaviors of the driver and may determine whether the normal judgment ability or physical movement ability has been lost from the determination result. The driver monitoring unit 42 outputs the determination result to the electronic control unit 60.

The setting/control operation unit 43 is provided for various setting operations and control operations on the vehicle by the driver and the like. For example, in the setting/control operation unit 43, a setting operation and an approval operation of a traveling route, a traveling mode, and the like are performed. Furthermore, the setting/control operation unit 43 performs a control operation to invalidate a part of or all of a vehicle braking sequence to be described later. The setting/control operation unit 43 outputs an operation signal according to the operation of the driver and the like to the electronic control unit 60.

The manual drive operation unit 44 is operated by the driver when performing a manual drive. The manual drive operation unit 44 includes, for example, a steering wheel, an accelerator pedal, a brake pedal, and the like, and outputs an operation signal according to the operation of the driver to the electronic control unit 60. Note that the manual drive operation in the present invention is not limited to a drive operation by using manual transmission. The manual drive operation indicates overall drive operation in which the driver intervenes.

The actuator unit 45 performs a drive operation during the automatic drive or the manual drive. The actuator unit 45 includes, for example, a steering actuator, an accelerator actuator, a brake actuator. On the basis of a drive signal generated according to the automatic drive by the electronic control unit 60 or a drive signal generated by the electronic control unit 60 according to the operation signal from the manual drive operation unit 44, the actuator unit 45 drives the steering wheel, the accelerator, the brake, and the like.

Figure 2:
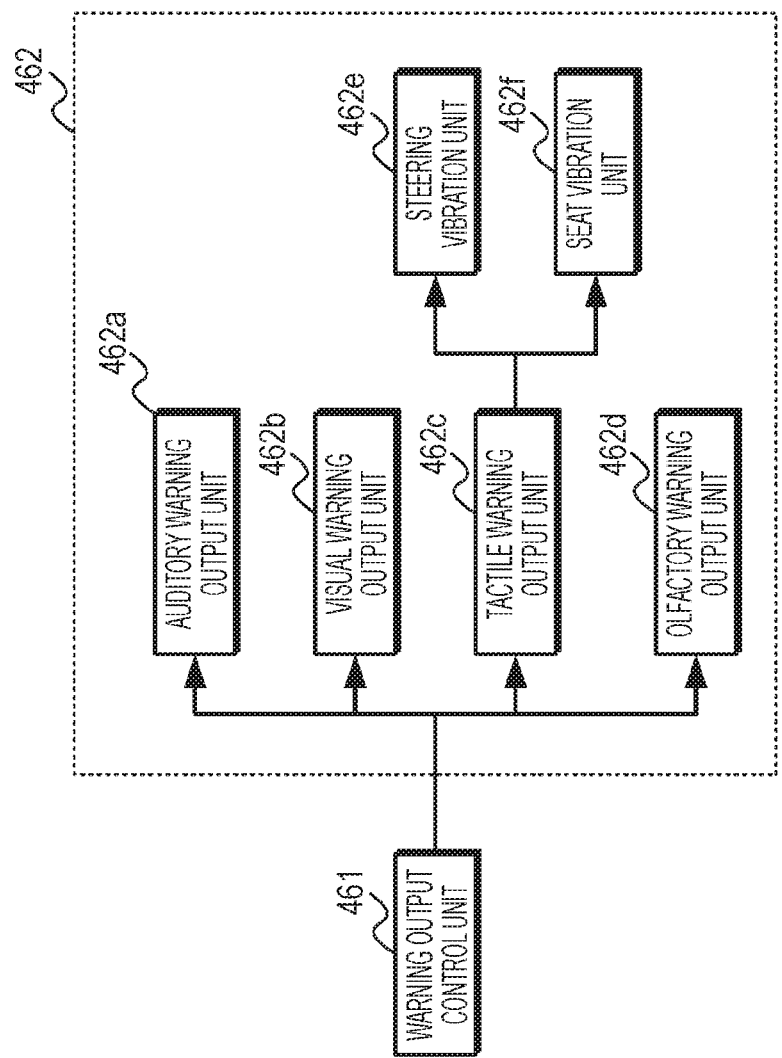
FIG. 2 is a diagram of a configuration of a driver warning unit.

A vehicle brake instruction from outside is issued on the basis of the surrounding environment information, and the driver warning unit 46 notifies the driver of the start of the vehicle braking sequence. The notification to the driver is performed by using five senses of the driver. In FIG. 2, a configuration of the driver warning unit is exemplified. The driver warning unit 46 includes a warning output control unit 461 and a warning output unit 462. The warning output unit 462 includes an auditory warning output unit 462a, a visual warning output unit 462b, a tactile warning output unit 462c, and an olfactory warning output unit 462d. The tactile warning output unit 462c is connected to, for example, a steering vibration unit 462e and a seat vibration unit 462f.

The warning output control unit 461 generates a warning drive signal on the basis of a warning control signal from the electronic control unit 60 so as to recognize the start of the vehicle braking sequence by using the five senses of the driver from the warning output unit 462. Note that the warning is not limited to the warning regarding the start of the vehicle braking sequence, and the warning may be issued so that the driver can recognize the reason of the start of the vehicle braking sequence and the like.

The auditory warning output unit 462a is formed of, for example, a speaker, and notifies the start of the vehicle braking sequence by voice. The visual warning output unit 462b is formed of a display device, and notifies the start of the vehicle braking sequence by using characters, images, and the like. As the display device, a navigation display device may be used, and a display device may be provided in an indicator. The tactile warning output unit 462c supplies a vibration drive signal to the steering vibration unit 462e and notifies the start of the vehicle braking sequence by vibrating the steering wheel. Furthermore, the tactile warning output unit 462c supplies the vibration drive signal to the seat vibration unit 462f, and notifies the start of the vehicle braking sequence by vibrating the seat where the driver seats. The olfactory warning output unit 462d outputs specific aroma or irritating smell so that the driver can recognize the start of the vehicle braking sequence.

The external notification unit 47 generates a warning drive signal on the basis of the warning control signal from the electronic control unit 60 so as to recognize the start of the vehicle braking sequence from the outside. The external notification unit 47 supplies, for example, the warning drive signal to hazard lights or stop lights to notify the outside that the vehicle braking sequence has been started by using the hazard lights or the stop lights.

The electronic control unit 60 includes a vehicle control processing unit 61, a recording and reproduction processing unit 62, and the like. The vehicle control processing unit 61 recognizes the vehicle brake instruction from outside on the basis of the surrounding environment information acquired by the environment information acquisition unit 20 and starts vehicle brake control, for example, the vehicle braking sequence on the basis of the recognition result. The vehicle braking sequence includes at least one of lighting the hazard light, lighting a brake light, evacuating from an automatic traveling lane, decelerating the vehicle, slowing down the vehicle, and stopping the vehicle. At the time of recognizing the vehicle brake instruction, subject recognition, voice recognition, and contact and impact recognition are performed, and a signal or a gesture of a third party at outside, a specific sound such as an intermittent horn, a contact with a specific part, or an impact with a specific pattern are recognized as the vehicle brake instruction. Furthermore, the vehicle control processing unit 61 generates a drive signal on the basis of the surrounding environment information acquired by the environment information acquisition unit 20, and outputs the drive signal to the actuator unit 45 to control the automatic drive. In addition, the vehicle control processing unit 61 generates a drive signal on the basis of the operation signal from the manual drive operation unit 44 and outputs the drive signal to the actuator unit 45 to control the manual drive.

The recording and reproduction processing unit 62 records an event and an incident so as not to be deleted. For example, in a case where the vehicle braking sequence is started, the start of the vehicle braking sequence, the cause of start of the vehicle braking sequence, and the like are recorded as an incident. Furthermore, after the vehicle braking sequence has been started, invalidation of a part of or all of the vehicle braking sequence is recorded as an event. Information on the event and the incident is recorded so as not to be rewritten and deleted so that the information cannot be falsified. Furthermore, the information can be recorded by encrypting the information so that a content of the information cannot be easily recognized.

Furthermore, the electronic control unit 60 includes a functional block and the like which performs navigation on the basis of the operation signal from the setting/control operation unit 43, the stored various information, and the like. In addition, the electronic control unit 60 may include a central processing unit (CPU), a memory, and the like. In this case, the CPU of the electronic control unit 60 performs various control described above by using a drive control program stored in the memory, a program of the vehicle braking sequence, a program of the subject recognition, map information, and various information to control the drive.

<2. Operation of Vehicle Control Device>

Figure 3:
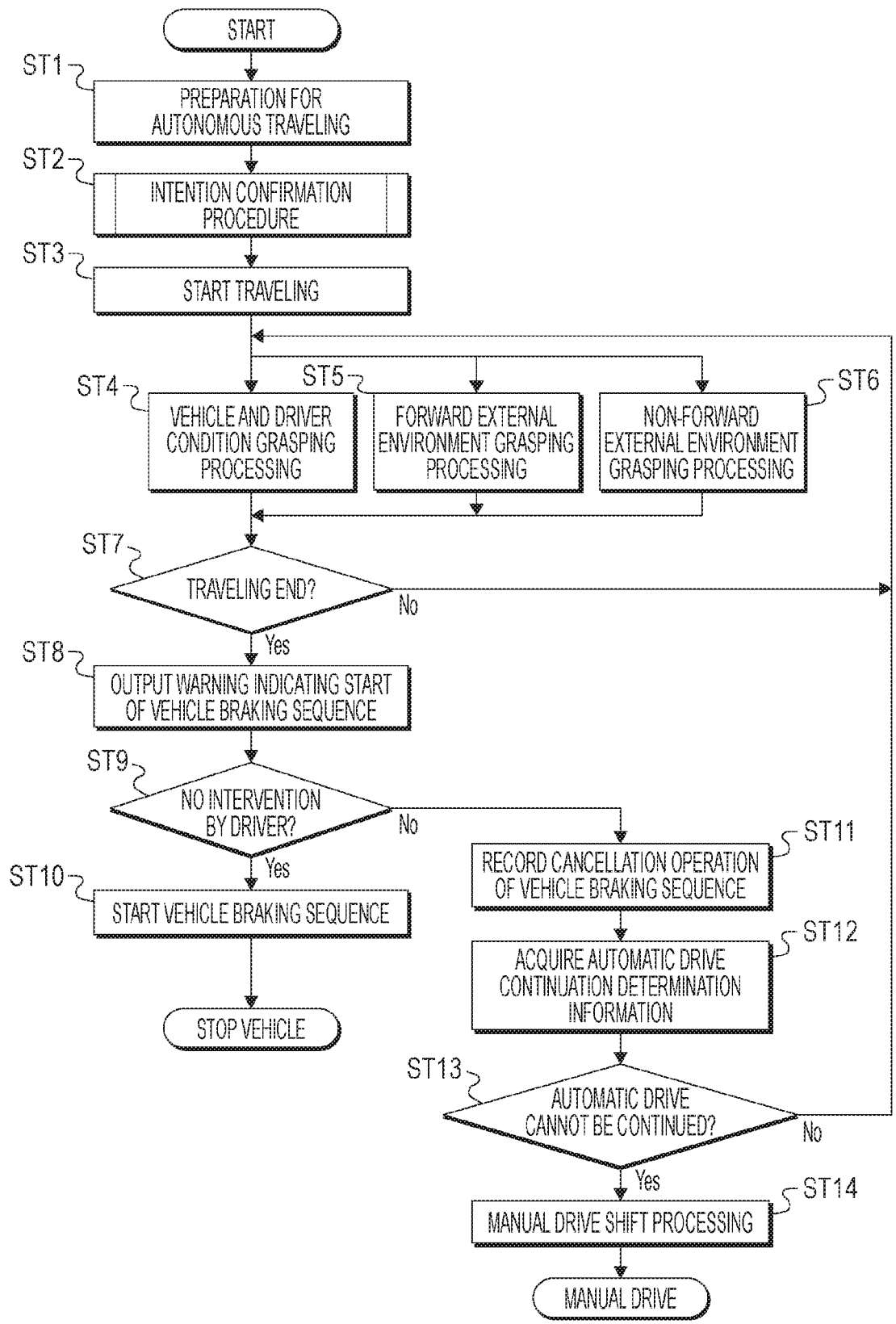
FIG. 3 is a flowchart of an operation of the vehicle control device.

Next, an operation of the vehicle control device will be described. FIG. 3 is a flowchart of the operation of the vehicle control device. In step ST1, the vehicle control processing unit 61 prepares autonomous traveling. The vehicle control processing unit 61 confirms the position of the vehicle, for example, on the basis of the information acquired by the position and traffic information acquisition unit 26. Furthermore, on the basis of a destination and a route which have been set on the basis of a setting operation in the setting/control operation unit 43, the vehicle control processing unit 61 can acquire information on the route which can be used by the automatic drive from a communication unit and the like. In addition, the vehicle control processing unit 61 may acquire weather data and the like to the destination, and may perform self-diagnosis of the vehicle, diagnosis of manual driving ability of the driver, and the like. In addition, as the preparation for the autonomous traveling, a step of confirming whether the driver knows characteristics of the autonomous traveling vehicle may be included. For example, a drive availability determination unit may be provided in the vehicle control processing unit 61, and the drive availability determination unit may permit the drive in a case where it has been recognized that the driver holds a driver's license which indicates that the driver can drive an automatic drive vehicle. In addition, an authentication function is provided in the drive availability determination unit and individually authenticates the driver, and a permission to drive may be issued on the basis of the authentication result. If the authentication function is provided in this way, a person who drives the vehicle can be limited to only the previously registered driver, and unauthorized use of the vehicle and the like can be prevented. Note that the drive availability determination unit can be provided in a vehicle which does not include a function to start the vehicle braking sequence on the basis of the recognition result of the vehicle brake instruction. The vehicle control processing unit 61 prepares the autonomous traveling as described above, and the processing proceeds to step ST2.

In step ST2, the vehicle control processing unit 61 performs an intention confirmation procedure. The vehicle control processing unit 61 confirms an approval operation by the driver with respect to the traveling route, the traveling mode, and the like. For example, the traveling route can be selected from among a route with the shortest travel distance, a route with the shortest required time, a route with the lowest fee, a route giving priority to the highway, a route passing through a place with a good view, a route learned on the basis of a travel history in the past, and the like. Furthermore, the traveling mode can be selected from among a normal traveling mode, a fuel efficiency priority traveling mode, and the like. The vehicle control processing unit 61 confirms the approval operation by the driver with respect to the traveling route and the traveling mode selected in the preparation for the autonomous traveling in step ST1, and the processing proceeds to step ST3.

In step ST3, the vehicle control processing unit 61 starts traveling. The vehicle control processing unit 61 starts the autonomous automatic drive in the approved traveling mode and traveling route, and the processing proceeds to step ST4 to step ST6.

In step ST4, the vehicle control processing unit 61 performs vehicle and driver condition grasping processing. The vehicle control processing unit 61 grasps whether an abnormality has been detected by the self-diagnosis. Furthermore, the vehicle control processing unit 61 grasps whether the driver loses the normal judgment ability and physical movement ability on the basis of the recognition result from the driver monitoring unit 42. The vehicle control processing unit 61 grasps the conditions of the vehicle and the driver, and the processing proceeds to step ST7.

In step ST5, the vehicle control processing unit 61 performs forward external environment grasping processing. By performing the forward external environment grasping processing, the vehicle control processing unit 61 recognizes predetermined external stimulation information in the surrounding environment information in front of the vehicle which has been acquired by the environment information acquisition unit 20. For example, the vehicle control processing unit 61 recognizes a signal and a gesture of a person outside and in front of the vehicle imaged by the imaging unit 21 and recognizes the brake instruction action of a vehicle in front of the vehicle. Here, in a case where a lateral swing motion of an upper arm is generally recognized as a gesture to start the vehicle braking sequence, the vehicle control processing unit 61 recognizes the gesture indicating a movement of a specific pattern as indicated above as the predetermined external stimulation information. In addition, in a case where a signal is defined to be common in all countries so that the vehicle braking sequence can be started by a police officer and the like, the vehicle control processing unit 61 recognizes the defined specific signal as the predetermined external stimulation information. Furthermore, the vehicle control processing unit 61 recognizes that a specific pattern of a direction indicator on the passing lane side of the vehicle is blinked or lighted as the signal to start the vehicle braking sequence and recognizes the signal as the predetermined external stimulation information. Furthermore, in a case where an emergency vehicle is included in the imaged image of the forward external environment, the image of the emergency vehicle may be recognized as the predetermined external stimulation information. The vehicle control processing unit 61 performs the forward external environment grasping processing in this way, and the processing proceeds to step ST7. Furthermore, the vehicle control processing unit 61 not only recognizes the predetermined external stimulation information but also recognizes a traveling environment. The vehicle control processing unit 61 recognizes, for example, a line on the road, a vehicle and a pedestrian in front of the vehicle, and the like by using the imaged image of the forward external environment obtained by the imaging unit 21.

In step ST6, the vehicle control processing unit 61 performs non-forward external environment grasping processing. By performing the non-forward external environment grasping processing, the vehicle control processing unit 61 recognizes predetermined external stimulation information in the surrounding environment information of the non-forward external environment which has been acquired by the environment information acquisition unit 20. For example, the vehicle control processing unit 61 recognizes the signal and the gesture of the person in the non-forward external environment described above imaged by the imaging unit 21 as the predetermined external stimulation information. Furthermore, the vehicle control processing unit 61 acquires the detection result from the sensor unit 24, and recognizes a specific sound such as a horn sound with a specific pattern from a peripheral vehicle, a whistle sound used by a police officer and the like, and a siren sound of the emergency vehicle as the predetermined external stimulation information. In addition, the vehicle control processing unit 61 acquires the detection result from the sensor unit 24, and recognizes a contact with an external third party relative to the specific part of the vehicle, for example, the side mirror, an impact with a specific pattern from outside, a collision with the following vehicle, and the like as the predetermined external stimulation information. In addition, the vehicle control processing unit 61 grasps a condition of the non-forward external environment on the basis of reception information of the communication unit 25. For example, wireless reception information indicating approach of the emergency vehicle acquired through communication via the wireless communication network of the DSRC or the like is recognized as the predetermined external stimulation information. Furthermore, in a case where the vehicle is remotely managed via the wireless communication network, the vehicle control processing unit 61 recognizes a remote instruction from a management center which remotely manages the vehicle as the predetermined external stimulation information. In addition, the environment information acquisition unit 20 acquires at least one of the imaged image of a surrounding region, the surround sounds, and the wireless reception information as approach identification information for enabling the approach of the emergency vehicle to be identified, and the vehicle control processing unit 61 may use the image of the emergency vehicle in the imaged image, the specific sound of the emergency vehicle included in the surround sounds, and the wireless reception information indicating the approach of the emergency vehicle as a starting trigger of the vehicle braking sequence. The vehicle control processing unit 61 performs the non-forward external environment grasping processing in this way, and the processing proceeds to step ST7.

Note that the processing in step ST4 to step ST6 is not limited to be performed in parallel. For example, as long as it is possible to promptly determine the end of the traveling in step ST7 at the time when an abnormality occurs, the processing in steps ST4 to ST6 may be sequentially performed.

In step ST7, the vehicle control processing unit 61 determines whether to end the traveling. In a case where the electronic control unit has determined that there is no abnormality in the conditions of the vehicle and the driver and the grasped conditions in the forward and non-forward external environments when the traveling is continued, it is determined to continue to travel, and the processing returns to step ST4 to step ST6. Furthermore, in a case where the vehicle control processing unit 61 has determined that the abnormality is caused in any one of the conditions of the vehicle and the driver and the grasped conditions in the forward and non-forward external environments when the traveling is continued, the vehicle control processing unit 61 determines to end the traveling, and the processing proceeds to step ST8. For example, in a case where an abnormality has been detected by the self-diagnosis, or in a case where the driver monitoring unit 42 has recognized that the driver has lost the normal judgment ability and physical movement ability, the vehicle control processing unit 61 determines that the abnormality is caused. In addition, in a case of determining that a person in the external environment has made the predetermined signal or gesture, in a case where the external third party has knocked the vehicle body and the like, and in a case where the approach of the emergency vehicle has been recognized, the vehicle control processing unit 61 determines that the abnormality is caused.

In step ST8, the vehicle control processing unit 61 outputs a warning indicating the start of the vehicle braking sequence. The vehicle control processing unit 61 notifies the driver of the start of the vehicle braking sequence from the driver warning unit 46, and the processing proceeds to step ST9.

In step ST9, the vehicle control processing unit 61 determines whether the driver intervenes. The vehicle control processing unit 61 determines the intervention by the driver according to an operation to an invalidation operation switch for invalidating the vehicle braking sequence which is provided in the setting/control operation unit 43, for example. Furthermore, the vehicle control processing unit 61 may determine the intervention by the driver according to an operation of the manual drive operation unit 44, for example, a steering wheel operation, a brake operation, and the like after outputting the warning indicating the start of the vehicle braking sequence.

In a case where the invalidation operation of the vehicle braking sequence is not performed, the vehicle control processing unit 61 determines that the intervention by the driver has not performed, and the processing proceeds to step ST10. In a case where the invalidation operation of the vehicle braking sequence is performed, the vehicle control processing unit 61 determines that the intervention by the driver has been performed, and the processing proceeds to step ST11. Furthermore, the intervention by the driver may be determined as including the state of the driver. For example, the vehicle control processing unit 61 may assume that the invalidation operation which is performed in a state where it has been determined that the driver has the normal judgment ability and physical movement ability is effective.

In this way, if the intervention of the driver is determined after the start of the vehicle braking sequence is notified to the driver, for example, even if a malicious third party performs an action and the like for starting the vehicle braking sequence to stop the vehicle, the driver can invalidate the vehicle braking sequence on the basis of the action and the like. Furthermore, in a case where the vehicle braking sequence is started due to the approach of the emergency vehicle, the driver can invalidate the vehicle braking sequence when determining that the vehicle does not hinder the traveling of the emergency vehicle. The vehicle braking sequence includes at least one of turning on the hazard light, turning on a brake light, evacuating from an automatic traveling lane, decelerating the vehicle, slowing down the vehicle, and stopping the vehicle, and the invalidation may include partial or entire invalidation.

In step ST10, the vehicle control processing unit 61 starts the vehicle braking sequence. The vehicle control processing unit 61 starts the vehicle braking sequence and stops the vehicle to secure safety. For example, the vehicle control processing unit 61 outputs a notification signal to the external notification unit 47 and lights or blinks the hazard lights and brake lights so that the following vehicle can recognize the emergency stop of the vehicle. In addition, the vehicle control processing unit 61 outputs a brake control signal to the actuator unit 45, performs control to decelerate, to evacuate the vehicle to a shoulder of the road and the like, and to stop the vehicle. In addition, the vehicle control processing unit 61 may change the external notification according to the brake state. For example, at the start of braking, a blinking cycle is shortened to attract the attention of the following vehicle, and then, the cycle is lengthened as the speed of the vehicle speed decreases. In this way, the following vehicle can easily recognize the brake state of the vehicle. In addition, in a case where the vehicle braking sequence is started due to the approach of the emergency vehicle, the vehicle is evacuated to give priority to the traveling of the emergency vehicle.

In step ST11, the recording and reproduction processing unit 62 records a cancellation operation of the vehicle braking sequence. The recording and reproduction processing unit 62 records that the cancellation operation has been performed relative to the start of the vehicle braking sequence as the invalidation history of the vehicle braking sequence, and the processing proceeds to step ST12. Here, the recording and reproduction processing unit 62 records the invalidation history of the vehicle braking sequence so as not to be rewritten or deleted. By recording the invalidation history in this way, in a case where the vehicle braking sequence is started by the instruction from outside and the like, it can be recognized that the driver has intentionally canceled the vehicle braking sequence. Therefore, for example, when the vehicle braking sequence is started in response to a stop instruction or the like by a police officer, it is possible to record that the driver and the like has canceled the vehicle braking sequence without following the stop instruction. In addition, it is also possible to prevent the invalidation history from being falsified with by the driver or the like who has made an unfair act. In addition, by encrypting and recording the invalidation history, the recording and reproduction processing unit 62 can prevent the record of the invalidation history from being viewed by the driver and the like who has made an unfair act.

In step ST12, the vehicle control processing unit 61 acquires automatic drive continuation determination information. The vehicle control processing unit 61 acquires the automatic drive continuation determination information to determine whether the automatic drive can be continued. The vehicle control processing unit 61 acquires an automatic drive continuation instruction by the driver, self-diagnosis result, the recognition result such that there is no abnormality in traveling, and the like as the automatic drive continuation determination information, and the processing proceeds to step ST13.

In step ST13, the vehicle control processing unit 61 determines whether the automatic drive cannot be continued. On the basis of the acquired automatic drive continuation determination information, the vehicle control processing unit 61 determines whether the automatic drive cannot be continued. In a case where the automatic drive continu-ation determination information satisfies conditions of the automatic drive, the vehicle control processing unit 61 determines that the automatic drive can be continued, and the processing returns to step ST4 to step ST6. Then, the automatic drive is restarted. Furthermore, in a case where any one of the automatic drive continuation determination information does not satisfy the conditions of the automatic drive, the vehicle control processing unit 61 determines that the automatic drive cannot be continued, and the processing proceeds to step ST14. Furthermore, in a case where the start of the vehicle braking sequence is invalidated and the automatic drive is restarted, a limitation may be added such that the maximum speed is suppressed to be equal to or lower than a predetermined speed.

In step ST14, the vehicle control processing unit 61 performs manual drive shift processing. Since the vehicle control processing unit 61 has determined that the automatic drive cannot be continued in step ST13, the vehicle control processing unit 61 switches a control operation so that the driver can drive the vehicle by manual operation. That is, the vehicle control processing unit 61 switches the operation control so as to generate the drive signal according to the operation from the manual drive operation unit 44 and to supply the drive signal to the actuator unit 45 (in a case where operation is not performed by driving-by-wire, direct drive is permitted).

Next, an exemplary specific operation of the vehicle control device will be described. As a situation where a third party desires to stop the vehicle from outside, situations as illustrated in FIG. 4 are assumed. For example, regarding the driver, situations are assumed such that the behavior is wrong, the driver cannot be seen, the behavior of the driver is likely to be runaway as viewed from other person, and the like. Regarding the vehicle, situations are assumed such that the vehicle is traveling after committing a violation, the vehicle enters a traveling prohibited area, the vehicle is traveling in the traveling prohibited area, the vehicle is traveling a wrong way on a one-way road, and the vehicle hits-and-runs. Furthermore, regarding the external environment, situations are assumed such that a remote transmission indicating that abnormality occurs is notified to a passenger, a central monitoring service issues a remote command, an unexpected event such as an accident has occurred in a dedicated lane, a stop instruction to the following vehicle is required due to an emergency situation, the emergency vehicle is approaching, it is necessary to notify the following vehicle of the detection of an obstacle such as an accident and a disabled vehicle during traveling in the dedicated lane, and a closure of the lane due to an emergency event is notified (accident, flooding of river, and the like).

FIG. 5 is a diagram in which brake instructing sides and actions or information of brake instructions in a case where the vehicle is stopped from outside are exemplified.

In a case where a pedestrian, a person who was involved in an accident, and the like in front of the vehicle instructs to brake, the pedestrian or person who was involved in an accident instructs to stop the vehicle by the signal and the gesture as the brake instruction action. The signals and gestures can be exemplified by, for example, an action for raising and laterally swinging the hands and an action for raising and swinging the hands in an obliquely upward direction. The vehicle control processing unit 61 performs the forward external environment grasping processing. When the vehicle control processing unit 61 recognizes the upper arm of the person by using the imaged image of the forward environment and detects the action for raising and laterally swinging the hands and the action for raising and swinging the hands in an obliquely upward direction, the vehicle control processing unit 61 determines to end the traveling. Furthermore, in a case where it has been determined to end the traveling, the vehicle control processing unit 61 performs the processing in and after step ST8 in FIG. 3.

In a case where a pedestrian standing on the front and side of the vehicle (when vehicle is traveling at low speed) instructs to brake, the pedestrian performs a body touch with a specific pattern and touches a specific part of the mirror and the body as the brake instruction action. When detecting the touch with the specific pattern, the touch on the specific part, and the like in the non-forward external environment grasping processing, the vehicle control processing unit 61 determines to end the traveling.

In a case where a vehicle in front of the vehicle instructs to brake, the vehicle in front of the vehicle blinks and lights the direction indicator on the passing lane side in a specific pattern, outputs a specific sound, and the like as the brake instruction action. The vehicle control processing unit 61 recognizes the vehicle by using the imaged image of the forward external environment in the forward external environment grasping processing and determines to end the traveling when detecting that the recognized vehicle performs the action such as blinking and lighting the direction indicator on the passing lane side in the specific pattern. Alternatively, when the audio acquisition unit 22 has detected the specific sound and the like in the non-forward external environment grasping processing, it is determined to end the traveling.

In a case where a vehicle on the side instructs to brake, the vehicle on the side outputs a specific sound and the like as the brake instruction action. The vehicle control processing unit 61 determines to end the traveling when detecting the specific sound and the like in the non-forward external environment grasping processing.

In a case where a vehicle behind the vehicle instructs to brake, the vehicle behind the vehicle outputs a specific sound and the like as the brake instruction action. The vehicle control processing unit 61 determines to end the traveling when detecting the specific sound and the like in the non-forward external environment grasping processing.

In a case where a motorcycle which is traveling on the side instructs to brake, the motorcycle outputs a specific sound or touches in a specific pattern by a driver of the motorcycle or touches on a specific part as the brake instruction action. When detecting the specific sound or the touch in the specific pattern and the touch on the specific part in the non-forward external environment grasping processing, the vehicle control processing unit 61 determines to end the traveling.

In a case where a police officer and the like instructs to brake, the police officer and the like transmits emergency stop wireless information and the like via the wireless communication network (for example, DSRC) as the brake instruction action. When receiving the emergency stop wireless information and the like in the non-forward external environment grasping processing, the vehicle control processing unit 61 determines to end the traveling.

In a case where a road network having a road management system which can remotely control roads and a remote braking instruction can be issued to a traveling vehicle on each road, if a manager of the road management system can perform the brake instruction action or the brake instruction action can be automatically performed, in a case where a traveling trouble event occurs in the automatic traveling lane, wireless information for notifying an occurrence of the event, wireless information for notifying that automatic drive is temporarily stopped in a certain section, remote control information and the like are transmitted sufficiently before the place where the traveling trouble event occurs. When receiving the wireless information and the like from the road management system in the non-forward external environment grasping processing, the vehicle control processing unit 61 determines to end the traveling on the basis of the received wireless information.

FIG. 6 is a diagram of an exemplary action in a case where the vehicle brake instruction has been received. In a case where the driver does not intervene after the output of the warning indicating the start of the vehicle braking sequence, the vehicle control processing unit 61 continues the automatic drive, moves the vehicle to an evacuation lane on the basis of the vehicle braking sequence, and stops the vehicle. Furthermore, in a case where the operation enters the sequence to move the vehicle to the evacuation lane, the operation by the driver is limited so that the driver does not return the drive mode to the manual drive in haste.

In a case where the driver intervenes after the output of the warning indicating the start of the vehicle braking sequence, the vehicle control processing unit 61 switches the traveling mode to the manual drive. Furthermore, while traveling in the automatic drive lane, the vehicle is moved to the normal lane.

In a case where the traveling mode is switched to the manual drive, the vehicle control processing unit 61 performs awake state confirmation processing and confirms that the driver is in an awake state in which the driver can drive. For example, in a case where the setting/control operation unit 43 performs the operation for invalidating the vehicle braking sequence with a specific pattern which has been previously designated, it is determined that the driver is in the awake state in which the driver can drive. In this way, if the awake state is confirmed by using the recognition and determination, not by a simple operation for pressing a button which can be reflectively operated, the switching to the manual drive in an awake state in which the driver cannot be sufficiently drive can be prevented.

Furthermore, in a case where the traveling mode is switched to the manual drive, the vehicle control processing unit 61 may shift the traveling mode step by step. For example, in a case where the traveling mode is switched from the automatic drive to the manual drive, the speed is limited to make the vehicle safely travel immediately after the switching of the drive mode. Thereafter, after a predetermined period of time or a predetermined traveling distance has passed, the speed limitation is canceled, and the normal manual drive becomes available. In this way, if the traveling mode is shifted step by step, the shift to the safer manual drive can be completed. In a case where the traveling mode is switched to the manual drive, the switching history is recorded.

In addition, in a case where the driver has intervened after the output of the warning indicating the start of the vehicle braking sequence and the automatic drive is continued by an operation of a forcible continuous drive button and the like, the vehicle control processing unit 61 may limit the automatic drive. Furthermore, in the limitation of the automatic drive, a limitation level may be controlled, for example, according to a traveling condition at the time when the automatic drive is continued. For example, the vehicle control processing unit 61 increases the limitation level in general roads where the automatic drive is difficult than exclusive roads for vehicles, and makes the maximum speed in the automatic drive fall largely below a legal limit.

Furthermore, in a case where the vehicle braking sequence which is started, for example, in response to the approach of the emergency vehicle is invalidated and the automatic drive is continued, the vehicle control processing unit 61 limits the speed of the vehicle at the time of continuation to a speed at which the vehicle can promptly stop. In addition, in a case where the vehicle braking sequence which is started in response to the gesture of the third party and the like is invalidated and the automatic drive is continued, since the third party may have malicious intent, the vehicle control processing unit 61 reduces the limitation than that in a case of the approach of the emergency vehicle.

In a case where the automatic drive is continued, the recording and reproduction processing unit 62 records, for example, the encrypted history so as not to be rewritten and deleted at the time of the continuation. Furthermore, in a case where the continuation of the automatic drive violates laws or regulations, the vehicle control processing unit 61 may notify a police station and the like of the history regarding the continuation of the automatic drive via the wireless communication network and the like.

In this way, by acquiring the surrounding environment information of the vehicle, recognizing the vehicle brake instruction from outside on the basis of the surrounding environment information, and starting the vehicle braking sequence on the basis of the recognition result, it is possible to apply appropriate vehicle brake control from outside. Note that the vehicle brake instruction may be issued not only from the outside of the vehicle but also from a passenger seat or a rear seat. For example, an operation of a switch, which is provided in the passenger seat or the rear seat, to start the vehicle braking sequence, an impact with a specific pattern applied to the vehicle from the side of the passenger seat or the rear seat and the like may be regarded as the vehicle brake instruction.

In addition, the series of actions described herein can be performed by hardware, software, or a composite structure of the hardware and the software. In a case where the processing is performed by the software, a program in which a processing sequence has been recorded is installed in a memory, which is built in the electronic control unit 60, in a computer and executed.

For example, the program can be previously recorded in the hard disk, a solid state drive (SSD), and a read only memory (ROM) as recording media. Alternatively, the program can be temporarily or permanently stored (recorded) in a removable recording media such as a flexible disk, a compact disc read only memory (CD-ROM), a magneto optical (MO) disk, a digital versatile disc (DVD), a Blu-ray Disc (BD (registered trademark)), a magnetic disk, and a semiconductor memory card. These removable recording media can be provided as so-called package software.

Furthermore, the program may be installed from the removable recording media to the computer and may be transferred from an on-board diagnostics system (OBD system), a download site to the computer by a wired or wireless channel via a network such as a local area network (LAN) and the internet. The computer can receive the program transferred in this way and install the program in the recording media such as the built-in hard disk.

Note that the effects described herein are only exemplary and not limited to these. Furthermore, there may be an additional effect which is not described herein. Furthermore, the present technology should not be limited to the above-mentioned embodiments of the technology and interpreted. The embodiment of the technology discloses the present technology in forms of examples, and it is obvious that those skilled in the art can amend and substitute the embodiments without departing from the scope of the present technology. That is, claims should be considered in order to determine the scope of the present technology.

Furthermore, the vehicle control device according to the present technology can have the configuration below.

(1) A vehicle control device including:

an environment information acquisition unit configured to acquire surrounding environment information of a vehicle; and a vehicle braking control unit configured to recognize a vehicle brake instruction from outside on the basis of the surrounding environment information acquired by the environment information acquisition unit and start a vehicle braking sequence on the basis of the recognition result.

(2) The vehicle control device according to (1), in which the vehicle braking control unit recognizes predetermined external stimulation information included in the surrounding environment information as the vehicle brake instruction from outside and starts the vehicle braking sequence.

(3) The vehicle control device according to (2), in which the environment information acquisition unit acquires an image in which environment around the vehicle has been imaged as the surrounding environment information, and the vehicle braking control unit recognizes a specific signal or a movement with a specific pattern of a subject included in the acquired image as the vehicle brake instruction.

(4) The vehicle control device according to (2) or (3), in which the environment information acquisition unit acquires information indicating a contact with the vehicle or an impact on the vehicle as the surrounding environment information, and the vehicle braking control unit recognizes a contact to a specific part of the vehicle or an impact with a specific pattern on the vehicle as the vehicle brake instruction.

(5) The vehicle control device according to any one of (2) to (4), in which the environment information acquisition unit acquires surround sounds as the surrounding environment information, and the vehicle braking control unit recognizes a specific sound included in the surround sounds as the vehicle brake instruction.

(6) The vehicle control device according to any one of (2) to (5), in which the environment information acquisition unit acquires approach identification information for enabling an approach of an emergency vehicle to be identified as the surrounding environment information, and the vehicle braking control unit recognizes predetermined information included in the approach identification information as a vehicle brake instruction from outside.

(7) The vehicle control device according to (6), in which the environment information acquisition unit acquires at least one of an imaged image of a surrounding region, surround sounds, and wireless reception information as the approach identification information, and the vehicle braking control unit recognizes an image of the emergency vehicle in the imaged image, a specific sound of the emergency vehicle included in the surround sounds, and wireless reception information indicating the approach of the emergency vehicle as the vehicle brake instruction.

(8) The vehicle control device according to (6) or (7), in which in the vehicle braking sequence, control for evacuating the vehicle to prioritize traveling of the emergency vehicle or control for shifting a traveling mode to a manual drive is performed.

(9) The vehicle control device according to any one of (1) to (8), in which the vehicle braking sequence includes at least one of lighting hazard lights, lighting brake lights, evacuating from an automatic traveling lane, decelerating the vehicle, slowing down the vehicle, and stopping the vehicle.

(10) The vehicle control device according to any one of (1) to (9), in which the vehicle braking sequence includes processing for invalidating a part of or all of the vehicle braking sequence by an instruction from a driver after the vehicle braking sequence has been started.

(11) The vehicle control device according to (10), further including:

an operation unit configured to invalidate the vehicle braking sequence.

(12) The vehicle control device according to (10) or (11), further including:

a recording and reproduction processing unit configured to record an invalidation history of the vehicle braking sequence performed by an instruction by the driver so as not to be rewritten and deleted.

(13) The vehicle control device according to (12), in which the recording and reproduction processing unit encrypts and records the invalidation history.

(14) The vehicle control device according to any one of (10) to (13), in which in a case where the vehicle braking control unit invalidates the vehicle braking sequence and continues an automatic drive, the vehicle braking control unit adds limitation to the automatic drive according to a traveling condition at the time when the automatic drive is continued.

(15) The vehicle control device according to any one of (1) to (14), further including:

a driver warning unit configured to notify the driver of start of the vehicle braking sequence.

(16) The vehicle control device according to any one of (1) to (15), in which the vehicle braking sequence is a sequence for stopping the vehicle to secure safety.

(17) The vehicle control device according to any one of (1) to (16), in which the vehicle is an autonomous traveling vehicle capable of traveling without an intervention by the driver in a drive operation, and the vehicle control device further including:

a drive availability determination unit configured to determine whether the driver is capable of driving the autonomous traveling vehicle.

(18) The vehicle control device according to (17), in which the drive availability determination unit further has a function for authenticating the driver.

INDUSTRIAL APPLICABILITY

In a vehicle control device, a vehicle control method, and a program according to the present technology, surrounding environment information of a vehicle is acquired, and a vehicle brake instruction from outside is recognized on the basis of the surrounding environment information to start a vehicle braking sequence on the basis of the recognition result. Therefore, vehicle brake control can be easily applied to a traveling vehicle from outside. For example, in a case where an abnormality in an automatic driving operation is noticed or in a case where a driver cannot return to a manual drive, the vehicle brake control can be started from outside. Therefore, the present technology is suitable for automobiles and the like having an automatic traveling function.

REFERENCE SIGNS LIST 10 vehicle control device
20 environment information acquisition unit
21 imaging unit
22 audio acquisition unit
23 radar unit
24 sensor unit
25 communication unit
26 position and traffic information acquisition unit
41 emergency stop button
42 driver monitoring unit
43 setting/control operation unit
44 manual drive operation unit
45 actuator unit
45 driver warning unit
47 external notification unit
60 electronic control unit
61 vehicle control processing unit
62 recording and reproduction processing unit
461 warning output control unit
462 warning output unit

The invention claimed is:

1. An information processing apparatus for a vehicle, comprising:
circuitry configured to:
acquire information from an imaging apparatus, wherein the acquired information includes an image of an object captured by the imaging apparatus;
detect a first instruction based on the acquired information;
control a braking operation of the vehicle based on a result of the detection;
invalidate the braking operation based on a second instruction from a user of the vehicle; and
control a recording operation of the invalidation of the braking operation.

2. The information processing apparatus for the vehicle of claim 1, wherein the circuitry is further configured to recognize a movement, of the object, with a specific pattern in the acquired information as the first instruction.

3. The information processing apparatus for the vehicle of claim 1, wherein the first instruction indicates one of a contact with the vehicle or an impact on the vehicle.

4. The information processing apparatus for the vehicle of claim 1, wherein the first instruction indicates an action associated with generation of a warning sound.

5. The information processing apparatus for the vehicle of claim 4, wherein
the object is an emergency vehicle, and
the first instruction indicates an action associated with generation of a siren sound of the emergency vehicle.

6. The information processing apparatus for the vehicle of claim 4, wherein
the object is a police officer, and
the action associated with the generation of the warning sound is by the police officer.

7. The information processing apparatus for the vehicle of claim 1, wherein the circuitry is further configured to:

acquire approach identification information, wherein the approach identification information indicates an approach of an emergency vehicle towards the vehicle; and recognize specific information in the acquired approach identification information as the first instruction.

8. The information processing apparatus for the vehicle of claim 7, wherein the circuitry is further configured to recognize wireless reception information that indicates the approach of the emergency vehicle as the first instruction.

9. The information processing apparatus for the vehicle of claim 1, wherein
in the braking operation, the circuitry is further configured to control one of shift of a traveling mode of the vehicle to a manual drive of the vehicle or evacuation of the vehicle to prioritize traveling of an emergency vehicle.

10. The information processing apparatus for the vehicle of claim 1, wherein
in the braking operation, the circuitry is further configured to at least one of activate hazard lights, activate brake lights, control evacuation of the vehicle from an automatic traveling lane, control deceleration of the vehicle, or decrease a speed of the vehicle.

11. The information processing apparatus for the vehicle of claim 1, wherein
the circuitry is further configured to restrict an automatic drive mode based on the invalidation of the braking operation, and
the automatic drive mode is based on a traveling condition at a time of continuation of the automatic drive mode.

12. The information processing apparatus for the vehicle of claim 1, wherein
the circuitry is further configured to notify a warning to the user of the vehicle, and
the warning indicates a start of the braking operation.

13. The information processing apparatus for the vehicle of claim 12, wherein
the circuitry is further configured to determine a driving capability of a driver of the vehicle, and
the driving capability of the driver corresponds to a capability of the driver to drive the vehicle.

14. The information processing apparatus for the vehicle of claim 13, wherein the circuitry is further configured to stop the braking operation based on the determined driving capability of the driver.

15. The information processing apparatus for the vehicle of claim 1, wherein the braking operation corresponds to a sequence to stop the vehicle.

16. The information processing apparatus for the vehicle of claim 1, wherein the vehicle is an autonomous driving vehicle.

17. The information processing apparatus for the vehicle of claim 1, wherein the circuitry is further configured to authenticate a driver of the vehicle.

18. The information processing apparatus for the vehicle of claim 1, wherein
the object is a human, and
the first instruction corresponds to a gesture action of the human.

19. The information processing apparatus for the vehicle of claim 1, wherein
the object is a police officer, and
the first instruction corresponds to a gesture action of the police officer.

20. The information processing apparatus for the vehicle of claim 1, wherein the first instruction indicates one of a contact with a specific part of the vehicle or an impact on the specific part of the vehicle.

21. The information processing apparatus for the vehicle of claim 20, wherein the specific part of the vehicle is a rear part of the vehicle.

22. The information processing apparatus for the vehicle of claim 21, wherein the specific part of the vehicle is an outer mirror of the vehicle.

23. The information processing apparatus for the vehicle of claim 1, wherein
the recording operation includes a recordation of history of the invalidation of the braking operation, and
the recordation of the history is non-rewritable and undeletable.

24. The information processing apparatus for the vehicle of claim 23, wherein the recordation is encrypted recordation.

25. The information processing apparatus for the vehicle of claim 1, wherein the imaging apparatus is an in-vehicle imaging apparatus.

26. A control method of an information processing apparatus for a vehicle, the method comprising:
acquiring information from an imaging apparatus, wherein the acquired information includes an image of an object captured by the imaging apparatus;
detecting a first instruction based on the acquired information;
controlling a braking operation of the vehicle based on a result of the detection;
invalidating the braking operation based on a second instruction from a user of the vehicle; and
controlling a recording operation of the invalidation of the braking operation.

27. A non-transitory computer-readable medium having stored thereon, computer-executable instructions which, when executed by a computer, cause the computer to execute an information processing method for a vehicle, the information processing method comprising:
acquiring information from an imaging apparatus, wherein the acquired information includes an image of an object captured by the imaging apparatus;
detecting a first instruction based on the acquired information;
controlling a braking operation of the vehicle based on a result of the detection;
invalidating the braking operation based on a second instruction from a user of the vehicle; and
controlling a recording operation of the invalidation of the braking operation.

* * * * *